United States Patent [19]
Schrock et al.

[11] Patent Number: 6,035,142
[45] Date of Patent: *Mar. 7, 2000

[54] CAMERA WITH ADAPTIVE ANNOTATION RECALL

[75] Inventors: Anthony W. Schrock; Dolores A. Mallette, both of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,818

[22] Filed: Feb. 28, 1997

[51] Int. Cl.⁷ .............................. G03B 17/24; G03B 17/02
[52] U.S. Cl. ............................... 396/310; 396/299
[58] Field of Search ..................... 396/310, 311, 396/315, 317, 318, 319, 320, 287, 292, 299

[56] References Cited

U.S. PATENT DOCUMENTS

| | | | |
|---|---|---|---|
| 3,953,868 | 4/1976 | Kawamura et al. | 354/109 |
| 4,330,186 | 5/1982 | Hattori | 354/106 |
| 4,483,601 | 11/1984 | Sekida et al. | 354/288 |
| 4,853,733 | 8/1989 | Watanabe et al. | 354/412 |
| 5,040,016 | 8/1991 | Ishikawa et al. | 354/412 |
| 5,155,513 | 10/1992 | Matsumura et al. | 354/106 |
| 5,300,974 | 4/1994 | Stephenson, III | 354/75 |
| 5,376,981 | 12/1994 | Itoh | 354/106 |
| 5,479,228 | 12/1995 | Tamamura et al. | 396/319 |

*Primary Examiner*—Safet Metjahic
*Assistant Examiner*—Michael Dalakis
*Attorney, Agent, or Firm*—James D. Leimbach

[57] ABSTRACT

An annotation system for a camera comprising at least one storage area capable of storing annotations, an input/output interface operatively connected to both the camera and the storage area, a sorting algorithm that is run by a microprocessor for reordering previously used annotations according to a predetermined set of parameters such as the number of times the annotation has been used or the frequency of use of an annotation; and a recall function run by the microprocessor for selecting parameters used by the sorting algorithm. A time recording mechanism is provided via a real time clock to denote annotation time, and a counting mechanism to count the times a particular annotation was used are provided to yield parameters for the sorting algorithm by which previous annotations can be reordered. A user selectable recall mode switch activates a menu on the display to enable user selection of the recall sorting method.

10 Claims, 2 Drawing Sheets

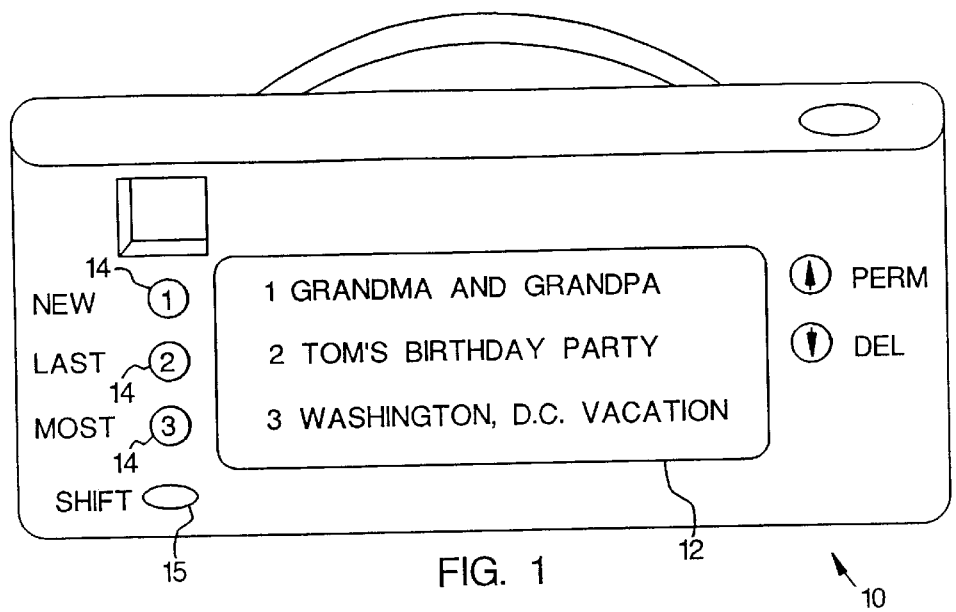
FIG. 1
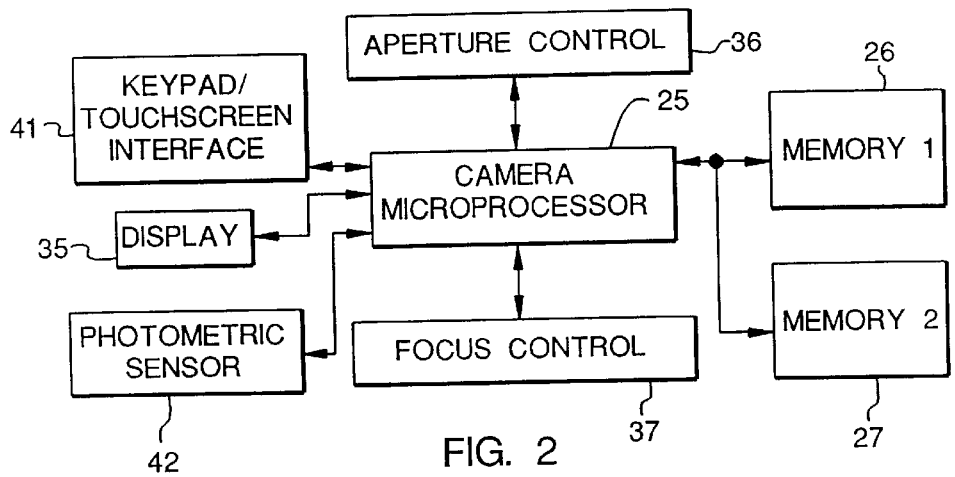
FIG. 2
| ADDRESS | ANNOTATION DATA | TIME STAMP | USAGE | DISPLAY |
|---|---|---|---|---|
| 0000 | TOM'S BIRTHDAY PARTY | 10/12/95 11:01 | 5 | 0 |
| 1*a | ANNIE AND BENNY | 8/12/96 13:43 | 23 | 1 |
| 2*a | GRANDMA & GRANDPA | 11/13/95 09:41 | 15 | 1 |
| 3*a | FRED AND JULIE | 01/01/96 12:02 | 5 | 0 |
| 4*a | CAMPING OUT | 08/07/96 15:50 | 12 | 0 |
| 5*a | GONE FISHING | 08/02/96 06:17 | 7 | 0 |
| 6*a | MARY AND TIM'S WEDDING | 06/05/96 16:46 | 7 | 0 |
|  |  |  |  |  |
|  |  |  |  |  |
| N*a | ANNOTATION N | mm/dd/yy hh:mm | nn | 0 |
FIG. 3

CAMERA WITH ADAPTIVE ANNOTATION RECALL

FIELD OF THE INVENTION

The present invention relates to cameras and more particularly to annotation systems used within cameras.

BACKGROUND OF THE INVENTION

Images are often used to convey information, but the image alone does not contain all the desired information. Image annotation is the process of adding additional information to the image for such uses as enhanced image enjoyment, reminders of the people or places in the image, industry applications, education, classification, and other imaging utilization areas that can benefit from incorporating additional information.

While annotation can be added anytime through a variety of methods, it is often desirable to provide for annotation at the time of picture taking. This suggests some form of on-camera annotation that does not interfere with the picture taking process. Additionally, the photographer often takes a series of pictures at a given location or event, or similar picture content at different times. Each of these situations may require similar annotations, but if the recall process is cumbersome, either the annotation is not added or an additional picture taking opportunity is lost while the annotation is recalled. large number of titles is difficult to manage. This management of data has not been limited to titles. U.S. Pat. No. 4,483,601 discloses a method of setting photographic data such as film speed and exposure settings where commonly used controls are always accessible, and seldom used controls are activated when a door on the camera is lifted. However, the determination of which controls are to be primary and secondary is determined by the manufacturer, rather than the user. U.S. Pat. No. 5,300,974 discloses a system whereby the user is able to set the preferences for photofinishing color balance, and the balance offsets are written to a memory within the camera. While this is a good example of having the camera adapt to the user, this method does not allow for any modification during the photographic process, such as typically required by annotation.

From the foregoing, it should be apparent that that there is a need within the art for a system that readily allows the placement of annotations during photographing.

SUMMARY OF INVENTION

It is the object of this invention to provide the user with configurable, adaptable annotation recall that will present data to the user sorted according to the user selection, such as by time or number of prior uses. It is a further object of this invention to allow user override, so that a particular annotation will always be presented regardless of the recall mode.

The foregoing and more is provided by a camera with an annotation system having at least one storage area capable of storing annotations, an input/output interface operatively connected to both the camera and the storage area, sorting means for reordering previously used annotations according to a predetermined set of parameters, and recall means for selection of parameters used by the sorting means.

ADVANTAGEOUS EFFECT OF THE INVENTION

This invention provides the user with a configurable means to rapidly recall prior input annotation, which is sorted according to the usage statistics of last time used or most often used. It further allows the user to input and recall annotation for special events or situations that will not affect the primary day-to-day annotation statistics.

BRIEF DESCRIPTION OF THE DRAWINGS

FIG. 1 is an illustration of a camera with a display and control buttons.

FIG. 2 shows a block diagram of the camera electronics.

FIG. 3 show the organization of the annotation data contained within the memory structure.

DETAILED DESCRIPTION OF THE INVENTION

Figure 4:
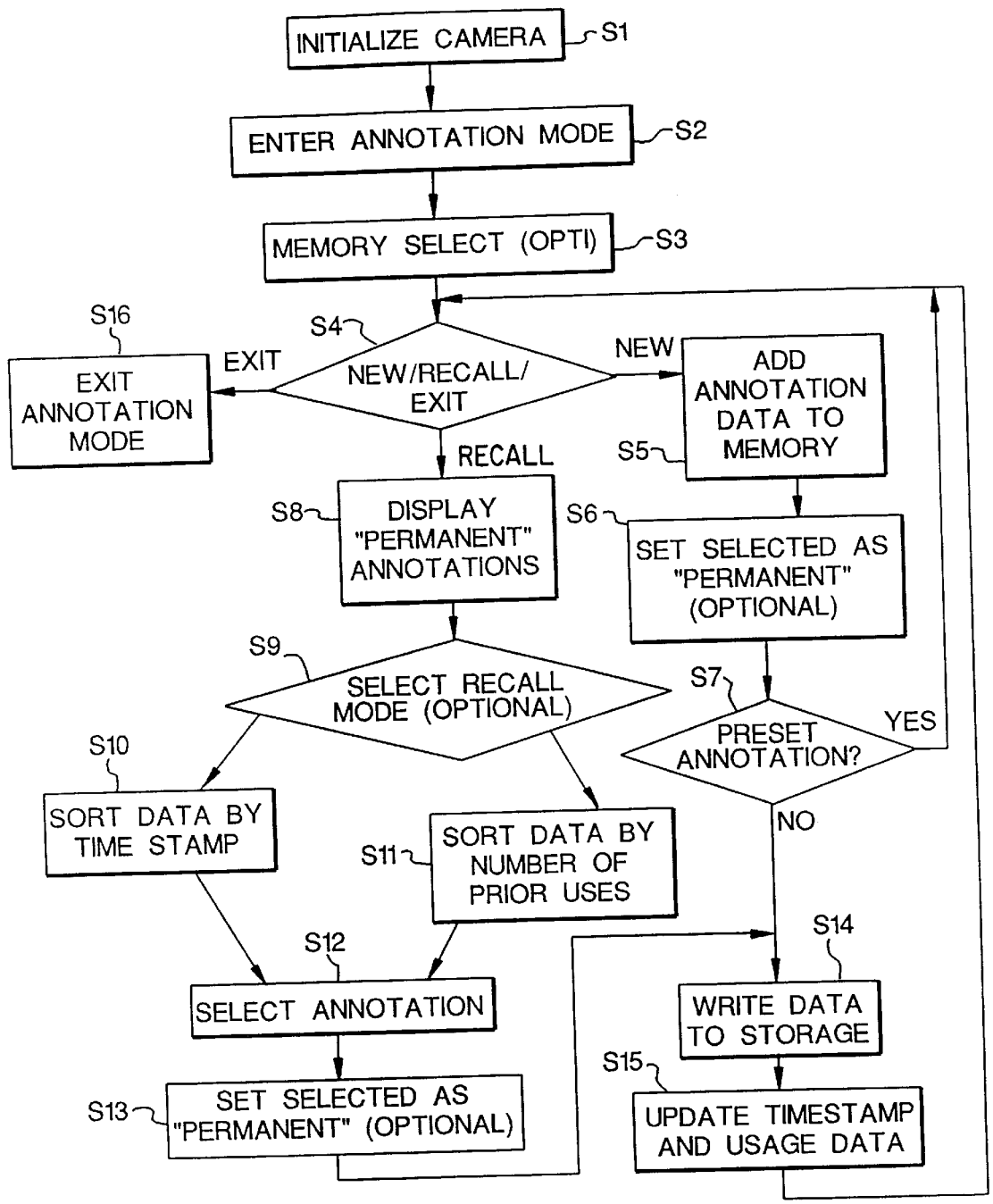
FIG. 4 is a flow chart illustrating the algorithm used by the annotation procedure.

Referring to FIG. 1, a camera 10 is shown in the annotation mode as envisioned by the present invention. As seen in FIG. 1, display 12 is showing annotation data previously entered. The keys 14 are multifunction keys, where the primary function is printed on the key and a secondary "shifted" function is printed beside the key and is accessed by first pressing the Shift button 15. Alternate methods include "softkeys" (not shown) with the appropriate legends listed on the display itself or use of a touch sensitive screen (not shown).

Referring to FIG. 2, microprocessor 25 functions to provide control over the interface with logic blocks to perform aperture control 36 and focus control 37 for the camera 10. Additionally, the microprocessor 25 controls the interface with the keypad/touchscreen 41 and the photometric sensor 42. Microprocessor 25 contains a real time clock that provides the capability to record the time and date on which an image was taken. Microprocessor 25 stores and retrieves data for its functions within memory devices 26, 27. The memory devices 26, 27 as shown in FIG. 2 are a non-volatile type of memory, such as battery backed memory or Flash EPROM. The necessity of this type of memory will become evident during the description of the annotation procedure.

FIG. 3 shows the organization of the annotation data contained within the memory devices 26, 27 to create an annotation table 50. The memory devices 26, 27 are structured as "a" bytes per record, with "N+1" records. Each record within the annotation table would typically begin at an address 51 that is an integral multiple of "a", and would typically have an annotation data field 52, a time stamp field 53, a usage field 54, and a display field 55. These fields are operated on as described below.

The operation of the camera can best be explained by the flow chart shown in FIG. 4 seen in conjunction with FIG. 2. The step of initialize camera, S1, is the power on initialization for the camera, that places the camera functions in a known, predetermined, state. After the camera is initialized, the enter annotation mode, S2, step which activates the buttons shown in FIG. 1. Memory select, S3, allows the user to optionally select the primary or secondary memory, with the default being the last memory used. New/recall/Exit S4 allows the user to select a new annotation, recall the previous annotation, or exit the annotation mode. If the user selects new annotation, the flow proceeds to Add Annotation Data to Memory S5, wherein, the annotation can be input through a variety of methods, such as an alphanumeric keypad, touchscreen, or a computer link to the camera. The user has the option to take the selected annotation and Set Selected as Permanent, S6, which makes the annotation part of the permanent sublist. If this option is selected, the "Display" field shown in FIG. 3 is set to non zero. Preset Annotation S7, allows the user to choose either to use the annotation immediately or store for later use (preset). If the annotation was preset, the flow returns to step S4. If the annotation from the step of Add Annotation Data to Memory S5 is to be used immediately, control then passes Write Data to Storage S14, where the annotation data is written to a corresponding image storage area, such as magnetics on film or solid state storage. At this time the Time Stamp field is updated to the current time and the Usage field is increased by one at Step S15.

The program then returns to New/Recall/Exit S4. If the user chooses to recall a previous annotation in step S4, the camera microprocessor accesses the annotation data memory to sort it for displaying on the screen. In Display Permanent Annotations S8, all data that has a non zero Display field are listed first. Select Recall Mode S9 gives the user the option of selecting the sorting method for the remaining annotation data. The user can select Sort by Time Stamp S10, where the data is sorted by subtracting the time stamp from the current time and ordering from the smallest difference to the largest, and is displayed after the permanent titles listed when the Display Permanent Annotations S8 function is run. Alternatively, Sort Data By Number of Prior Uses S11 can be selected at Selected recall Mode S9. In Sort Data By Number of Prior Uses S11, the data is sorted by the usage field, with the largest number of uses displayed first, and the smallest number of uses displayed last. If more than one annotation has the same Usage value, these are displayed in the order encountered.

Once the data is sorted and displayed, the function Select Annotation S12 allows the user to select one of the displayed selections. The selection is accomplished via the arrow scrolling keys and number selection keys as shown in FIG. 1. The control passes to a function step for Set Selected as Permanent S13 and the flow continues as before with control passing to Write Data to Storage S14, where the annotation data is written to a corresponding image storage area, such as magnetics on film or solid state storage. At this time the Time Stamp field is updated to the current time and the Usage field is increased by one at Step S15.

If the user selects the secondary memory option, all other operations remain the same with the difference being that memory read and write operations act upon the secondary memory and do not affect the primary memory. This allows the user to add annotations for special events without affecting the statistical parameters of the primary memory. It should be obvious that the memory retain data over long periods of time, so it must be a non-volatile technology, such as EPROM technology.

PARTS LIST
10 camera
12 display
14 keys
15 shift button
25 microprocessor
26 memory
26 memory
35 display
36 aperture control
37 focus control
41 keypad/touchscreen interface
42 photometric sensor
50 annotation table
51 address field
52 annotation data field
53 time stamp field
54 usage field
55 display field
S1 initialize camera function
S2 Enter Annotation Mode function
S3 Memory Select function
S4 New/Recall/Exit function
S5 Add Annotation Data to memory function
S6 Set selected as permanent
S7 Preset Annotation function
S8 Display Permanent Annotations function
S9 Select Recall Mode function
S10 Sort data by time stamp function
S11 Sort data by number of prior uses function
S12 Select annotation function
S13 Set selected as permanent function
S14 write data to storage function
S15 update timestamp and usage data function

We claim:

1. An annotation system for a camera comprising:

at least one storage area capable of storing annotations;

an input/output interface operatively connected to both the camera and the storage area;

sorting means within the camera and operatively connected to the storage area for arranging previously used annotations according to a predetermined set of parameters; and recall means for selection of parameters used by the sorting means the recall means including a display that presents a menu selection containing at least a portion of the predetermined set of parameters and means for selecting items from the menu selection.

2. The annotation system of claim 1 wherein the predetermined set of parameters is selected as one of either time of use or frequency of use.

3. The annotation system of claim 1 wherein the storage means further comprises a first storage device for storage of a first set of annotations, and at least a second storage device for storage of at least a second set of annotations.

4. The annotation system of claim 3 further comprising switching means for selection of one of the storage devices.

5. The annotation system of claim 1 further comprising a timing device within the camera.

6. The annotation system of claim 4 wherein the timing device within the camera is a real time clock capable of denoting time at which annotations are entered.

7. The annotation system of claim 1 wherein the counting means for providing an indication of the number of times a particular annotation was used.

8. The annotation system of claim 1 further comprising indication means for denoting display priority of annotation data.

9. A method of providing annotations within a camera comprising the steps of:

providing a camera with sorting means that are operatively coupled to at least one storage area capable of storing and arranging previously used annotations in accordance with a predetermined set of parameters;

operatively coupling the sorting means via an input/output interface to a visually discernible display that displays at least a portion of the predetermined set of parameters and allows the user to review a present recall setting; and selecting from the predetermined set of sorting parameters, a recall parameter to be incorporated into the present recall setting employed by the sorting means to arrange annotations in accordance with the recall parameter.

10. The method of claim 9 wherein the providing step further comprises that the predetermined set of parameters is selected as one of either time of use, frequency of use or priority.

* * * * *